United States Patent
Hoetzeldt

(10) Patent No.: US 9,302,456 B2
(45) Date of Patent: Apr. 5, 2016

(54) PANEL AND METHOD OF PRODUCING SAME

(71) Applicant: Airbus Operations GmbH, Hamburg (DE)

(72) Inventor: Stephan Hoetzeldt, Bremen (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/445,223

(22) Filed: Jul. 29, 2014

(65) Prior Publication Data

US 2015/0037549 A1 Feb. 5, 2015

(30) Foreign Application Priority Data

Jul. 31, 2013 (EP) ..................................... 13178669

(51) Int. Cl.
| | |
|---|---|
| *B32B 3/02* | (2006.01) |
| *B32B 37/10* | (2006.01) |
| *B32B 5/24* | (2006.01) |
| *B32B 7/04* | (2006.01) |
| *B32B 27/08* | (2006.01) |
| *B29C 70/46* | (2006.01) |
| *B29C 37/00* | (2006.01) |
| *B29L 31/30* | (2006.01) |
| *B29C 33/42* | (2006.01) |

(52) U.S. Cl.
CPC .............. *B32B 37/10* (2013.01); *B29C 37/0053* (2013.01); *B29C 70/465* (2013.01); *B32B 5/24* (2013.01); *B32B 7/045* (2013.01); *B32B 27/08* (2013.01); *B29C 33/424* (2013.01); *B29K 2995/0089* (2013.01); *B29L 2031/3041* (2013.01); *B29L 2031/3076* (2013.01); *B32B 2250/02* (2013.01); *B32B 2260/021* (2013.01); *B32B 2260/046* (2013.01); *B32B 2309/12* (2013.01); *B32B 2605/18* (2013.01); *Y10T 428/24802* (2015.01); *Y10T 428/24851* (2015.01)

(58) Field of Classification Search
CPC .. Y10T 428/24802; B32B 37/10; B32B 37/12
See application file for complete search history.

(56) References Cited

U.S. PATENT DOCUMENTS

| | | | | | |
|---|---|---|---|---|---|
| 3,361,610 | A | * | 1/1968 | Hannes .......................... | 156/219 |
| 4,240,857 | A | * | 12/1980 | DellaVecchia et al. ....... | 156/209 |
| 2007/0071957 | A1 | * | 3/2007 | Atkins et al. ................ | 428/292.1 |

FOREIGN PATENT DOCUMENTS

| | | |
|---|---|---|
| EP | 0 137 125 A2 | 4/1985 |
| EP | 2 030 764 A2 | 3/2009 |

OTHER PUBLICATIONS

Communication Jan. 9, 2014, enclosing search report EP 13 178 669.1 (search dated Dec. 18, 2013).

*Primary Examiner* — Elizabeth Mulvaney
(74) *Attorney, Agent, or Firm* — Lerner, David, Littenberg, Krumholz & Mentlik, LLP

(57) ABSTRACT

A method of producing a panel for lining or cladding an aircraft interior, such as an aircraft cargo hold includes arranging at least one resin layer of a thermo-plastic polymer and at least one reinforcement layer of reinforcement fibers upon one another in a stack, wherein each resin layer extends adjacent and/or substantially parallel to each reinforcement layer; and consolidating the stack to form a panel by applying heat and pressure to the stack. The pressure is applied to the stack in a direction substantially perpendicular to a primary plane of the layers. The pressure is applied to the stack in a non-constant distribution over the primary plane. A corresponding panel for lining or cladding an aircraft interior, such as a cargo hold is also described.

14 Claims, 1 Drawing Sheet

PANEL AND METHOD OF PRODUCING SAME

TECHNICAL FIELD

The present invention relates to a panel, in particular for lining or cladding an aircraft interior, such as a cargo hold of an aircraft, and to a method of producing such a panel.

BACKGROUND OF THE INVENTION

Panels that line or clad an aircraft cargo hold generally require good resistance to impact loads. Specifically, the cladding or lining panels should be sufficiently robust to withstand an impact from a cargo item or a restraining clasp or bracket in the event that a restraining strap or anchor should fail during transport. Panels for lining or cladding an aircraft interior, such as a cargo hold, have previously included thermoset polymer laminate materials, such as fibre-reinforced thermoset polymer laminates. Further developments of the cladding materials have been made for compliance with Fire, Smoke, Toxicity (and Heat Release) (i.e. FST(H)) and burn-through requirements (CS25.855(c), Appendix F, Part III) in combination with the necessary resistance to mechanical, environmental and surface demands. In this connection, use of fibre-reinforced thermoplastic polymer laminate materials has been also contemplated. The thermoplastic laminates, however, have generally exhibited a lower impact performance and lower toughness compared the thermoset polymer laminates. Also, the thermoplastic laminates typically provide less noise damping and the white coloured thermoplastic laminates typically used in interior linings in aircraft are pigmented with titanium dioxide ($TiO_2$) and are not as IR-transparent as the thermoset laminates.

BRIEF SUMMARY OF THE INVENTION

It is therefore an idea of the present invention to provide a new and improved panel, especially for lining an aircraft interior, such as an aircraft cargo hold, which may overcome one or more of the issues discussed above. More particularly, it would be desirable to provide such a panel which has good characteristics or properties in one or more of the areas of impact strength, toughness, noise damping, and transparency to infrared (IR) radiation, particularly when the panel has a white colour in visible light.

According to one aspect, therefore, the invention provides a method of producing a panel for lining or cladding an aircraft interior, such as an aircraft cargo hold, the method comprising:

arranging at least one resin layer of a thermo-plastic polymer and at least one reinforcement layer of reinforcement fibres upon one another in a stack, wherein each resin layer extends adjacent to and/or substantially parallel to each reinforcement layer; and consolidating the stack to form a panel by applying heat and pressure to the stack, wherein the pressure is applied to the stack in a direction substantially perpendicular to a primary plane of the layers, and the pressure is applied in a non-constant or non-uniform distribution over the primary plane.

In other words, various or different pressures are applied to the stack of layers over the primary plane. In this regard, the pressure applied to the stack may vary over the primary plane according to a distribution pattern, and in particular a predetermined distribution pattern. Thus, the distribution pattern will typically include regions of higher pressure and regions of lower pressure, and the regions of higher pressure and the regions of lower pressure are preferably provided in a regular pattern according to a pressure distribution mask.

Without wishing to be bound by theory, the present inventor considers that the sudden loads arising in a relatively high-speed impact generate high local bending tensions in a panel at the impact location, which cause high shear loading. Under a high-speed impact, therefore, a maximum value of the shear load may advance quickly to a maximum bending strain and thus become the mechanism responsible for damage to the panel. The higher the impact energy and the smaller an impact area, the more pronounced is the damaged. Surprisingly, the inventor has ascertained that, because the pressure (i.e. compressive pressure) applied to the stack is non-constant or non-uniform over the primary plane with the method of the invention, the bond or coupling formed or created between the thermoplastic resin layer(s) and fibres of the reinforcement layer(s) is incomplete and thus weaker in the lower pressure regions. In this way, a higher number of micro-voids is generated in the thermoplastic resin matrix in the regions of lower pressure, producing a weaker shear force bond or shear force coupling of the single fibres via the resin matrix. As a surprising result, a sudden or high-speed impact against the laminate is mainly converted into tension loads (instead of shear loads), which the reinforcing fibres of the laminate are better able to withstand than shear loads.

In one embodiment, the distribution mask includes a profiled pressure plate for pressing onto the stack of resin and reinforcement layers. In this regard, the pressure plate may have raised or projecting portions on a side of the plate facing the stack which form the regions of higher pressure and recesses or grooves between the raised portions defining the regions of lower pressure. The regions of lower pressure cover a substantially greater area than the regions of higher pressure in the primary plane; for example, at least double an area, preferably at least triple an area, more preferably at least five times an area of the regions of higher pressure in the primary plane. The profiled pressure plate may present a substantially regular pattern of raised or projecting portions and recesses or grooves; for example, in a checked or criss-crossed pattern, a honeycomb pattern, a dot pattern, and/or a line pattern. Because the regions of lower pressure generate relatively weak fusion or bonding of a resin layer to an adjacent fibre reinforcement layer, the overall adhesion or bonding quality is quite low, rendering the laminate of the panel more flexible, rather than stiff. For this reason, a C-scan (i.e. a non-destructive ultrasound inspection technique for detecting voids, delamination, state of resin cure, fibre volume fraction, and/or condition of the fibre/matrix interface via short pulses of ultrasonic energy) is not generally necessary.

In another embodiment of the method, the arranging comprises: arranging a plurality of the resin layers and a plurality of the reinforcement layers upon one another in the stack. That is, the stack preferably includes a plurality of the resin layers and a plurality of the reinforcement layers, with the resin layers being interspersed with, and preferably alternating with, the reinforcement layers. Thus, the stack may have a thickness in the range of about 0.1 mm to 10 mm, and preferably in the range of about 1 mm to 5 mm.

In another embodiment, the arranging further includes: arranging a first resin layer on a support or base, e.g. a substantially flat support or base, such as a table, to commence the stack. Preferably, the first resin layer is white in normal or visible light, e.g. daylight, and has a high transmission rate of infrared (IR) radiation. In this respect, the first resin layer may comprise polytetra-fluorethylene (PTFE).

In another embodiment, the arranging may include: arranging a sound damping layer in a central region of the stack between the resin layers and the reinforcement layers. The sound damping layer preferably includes a resilient sheet of a polyolefin, especially polyethylene. The resilient sheet preferably has a multi-layered structure (e.g. with optional air-pockets) to provide a high acoustic opacity.

In another embodiment, each resin layer in the stack comprises a sheet or film of thermoplastic polymer, preferably selected from the group of polyetherimide (PEI), polyetheretherketone (PEEK) or polytetrafluorethylene (PTFE). In this regard, the thermoplastic resin layers may include "Ultem 1000" (i.e. standard PEI) as the matrix material. With the present invention, an expensive powder-impregnation (e.g. with PEI powder) is not necessary, so that production of the thermoplastic laminates can be carried out in fewer process steps with less costly materials.

In another embodiment, each reinforcement layer in the stack comprises a sheet of reinforcement fibres, preferably a sheet or mat of woven or non-woven fabric comprising carbon fibres, glass fibres and/or aramid fibres.

According to another aspect, therefore, the present invention provides a panel for lining or cladding an aircraft interior, such as a cargo hold of an aircraft, the panel comprising a laminate of one or more thermoplastic resin layers and one or more fibre reinforcement layers, wherein the thermoplastic resin layers are non-uniformly fused or bonded with the fibre reinforcement layers, preferably according to a particular or predetermined pattern. Thus, in a preferred embodiment, the panel includes a pattern of non-uniform fusion or non-uniform bonding of the resin layers with the reinforcement layers over a primary plane of the panel.

In another embodiment, the pattern of non-uniform fusion or bonding of the resin layers with the reinforcement layers includes a plurality of regions of low fusion or low bonding separated by lines or regions of high fusion or high bonding. In this regard, it will be appreciated that the regions of low fusion or low bonding typically occupy a substantially larger area of a primary plane of the panel than the lines or regions of high fusion or high bonding.

According to a further aspect, the present invention provides a vehicle, such as an aircraft, incorporating one or more panel for lining an interior thereof, the panel produced by a method according to any of the embodiments of the invention as described above.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which.

DETAILED DESCRIPTION

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
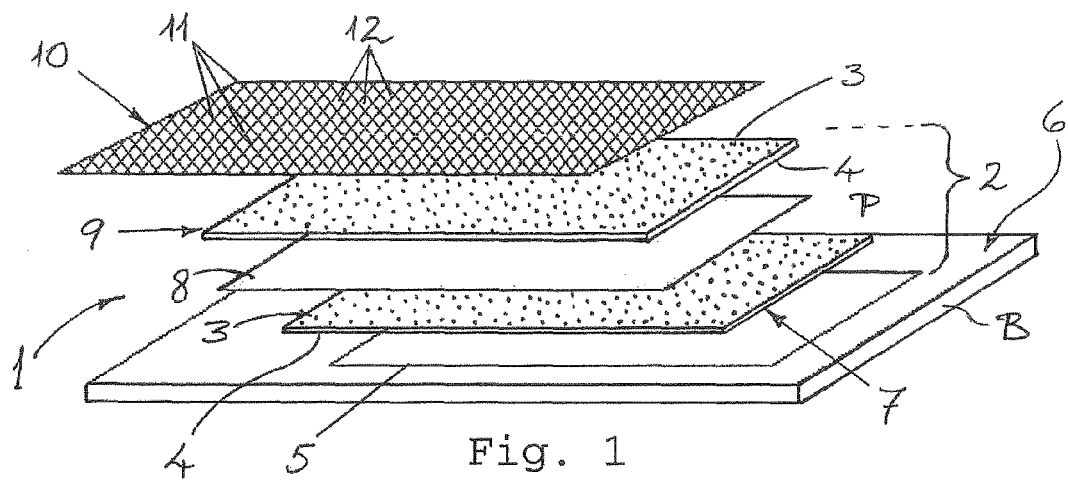
FIG. 1 is an exploded perspective view of production of a panel according to an embodiment.

With reference firstly to FIG. 1 of the drawings, a method of forming or producing a panel 1 for lining a cargo hold of an aircraft (not shown) according to a preferred embodiment will be described. The panel 1, which is shown in an exploded view as comprising a lay-up of various layers in a stack 2, has a number of thermoplastic resin layers 3 and a number of fibre reinforcement layers 4. In building up the stack 2 of layers to form a laminate structure for the panel, a first thermo-plastic resin layer 5 is provided by laying a sheet or film of thermoplastic polymer upon a flat support surface 6, which is provided here by an upper surface of table or base B. The first resin layer 5 in this particular embodiment is white in the visible light spectrum, with a high IR-transparency and preferably also good chemical resistance to aviation fluids, such as the fluid "Skydrol". In this particular embodiment, the first resin layer 5 comprises PTFE.

Upon this first resin layer 5, a first group or sub-stack 7 of alternating resin layers 3 and reinforcement layers 4 are laid. Each resin layer 3 is provided as a sheet or film of a thermoplastic polymer or resin, such as PEI (e.g. in the form of "Ultem 1000"). Each reinforcement layer 4, on the other hand, is provided as a sheet or mat of reinforcement fibre fabric (e.g. a woven or non-woven fabric of glass fibres). In a central region of the stack 2, a damping layer 8 is then provided or arranged on the first group or sub-stack 7 of resin and reinforcement layers 3, 4. The damping layer 8 may, for example, comprise a resilient sheet of polyethylene (PE) having a multi-layered structure to provide acoustic damping properties. Above the damping layer 8, a second group or sub-stack 9 of alternating thermoplastic resin layers 3 and fibre reinforcement layers 4 are provided or laid (e.g. each resin layer 3 again provided as a sheet or film of a thermoplastic polymer, such as PEI, and each reinforcement layer 4 provided as a sheet of woven or non-woven fabric of glass fibres).

After the various layers 3, 4, 5, 8 of the laminate structure are arranged on one another in the stack 2 and substantially parallel to one another to define a primary plane P of the panel 1 (i.e. generally parallel to a plane of each layer and to the support surface 6 of the table or base B), a pressure distribution mask 10 is placed on top of the stack 2 of layers to consolidate the stack to form the panel 1. In this regard, the step or procedure of consolidating the stack 2 includes applying pressure and heat to press and to fuse or bond the thermoplastic layers 3, 5, 8 to the fibres of the reinforcement layers 4. In particular, under application of heat, the thermoplastic polymer sheets or films in the resin layers 3, 5, 8 will soften or melt into a viscous fluid state and the application of compressive force generating pressure in a downward direction (i.e. substantially perpendicular to the primary plane P of the panel 1 and thereby substantially perpendicular to the supporting surface 6 of the table) acts to generate intimate fusion or coupling of the fibres in the reinforcement layers 4 with the thermoplastic polymer of the softened resin layers 3, 5, 8.

As is schematically shown in FIG. 1 of the drawings, however, the pressure distribution mask 10 does not present a uniform surface for contact with the stacked layers of the polymer laminate. On the contrary, the distribution mask 10 is formed as a profiled pressure plate having a criss-crossed array of projecting linear ribs 11 separated by recesses 12. As such, when the pressure distribution mask 10 is applied and pressed down onto the stack 2 of resin and reinforcement layers 3, 4 forming the panel 1, the projecting linear ribs 11 apply a relatively high pressure to their regions of contact with the laminate stack 2, whereas the recesses 12 between the ribs 11 in the profiled pressure plate 10 provide relatively low pressure to the stack 2. In this way, the pressure applied to the stack 2 is distributed in a non-constant or non-uniform manner over the primary plane P of the panel 1. This has the effect that a quality or degree of fusion or bonding between the individual resin and reinforcement layers 3, 4 is non-uniform or non-constant over a primary plane P of the panel, depending upon whether or not a particular part of the said panel 1 corresponds to a higher pressure region of one of the linear ribs 11 or a lower pressure region of one of the recesses 12 between the ribs.

Thus, in the regions of lower pressure between the ribs 11 in the profiled pressure plate, the bond or coupling created between the thermoplastic resin layers 3 and the fibres of the reinforcement layers 4 comprises a high number of micro-voids and thus produces a weaker shear force bond or shear force coupling of the individual fibres via the resin matrix. This then produces the surprising result that the laminate is better suited to withstanding high-speed impact loads. That is, a weaker shear force coupling of individual fibres with the resin matrix enables the forces generated by a high speed impact to be mainly converted or transferred to tension loads in the reinforcing fibres, which those fibres are better able to withstand than the shear loads typically generated by high speed impacts in the prior art laminates.

Figure 2:
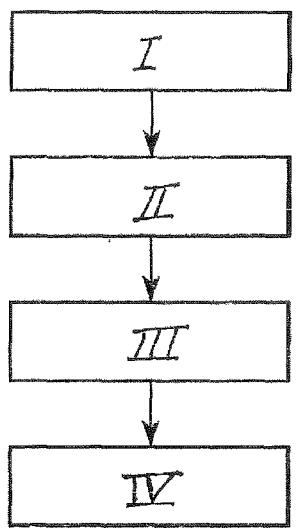
FIG. 2 is a flow diagram representing steps of a method according to an embodiment.

Referring now to FIG. 2 of the drawings, a flow diagram is shown that schematically illustrates steps in the method of forming a panel 1 according to an embodiment of the invention described above with respect to FIG. 1. In this regard, the first box I of FIG. 2 represents the step of providing a base or support surface 6, which is preferably substantially flat, upon which to lay-up a laminate structure for the panel 1. The second box II then represents the step of arranging a plurality of thermoplastic resin layers 3 and a plurality of fibre reinforcement layers 4 upon one another in a stack 2, so that each resin layer 3 extends adjacent and substantially parallel to each reinforcement layer 4 to define a primary plane P of the panel. The third box III represents the step of providing a pressure distribution mask 10 in the form of a profiled pressure plate for consolidating the stack 2 to form the panel 1. The final box IV in FIG. 2 represents the step of consolidating the stack 2 to form a panel 1 by applying heat and pressure to the stack 2. In this regard, pressure is applied to the stack 2 with the pressure distribution mask 10 in a direction generally perpendicular to the primary plane of the layers 3, 4. In particular, the pressure is applied to the stack 2 in a non-constant distribution over the primary plane to produce non-uniform fusion or bonding of the thermo-plastic resin layers 3 with the fibres of the reinforcement layers 4 over the primary plane, e.g. with a high density of micro-voids in the panel 1.

Figure 3:
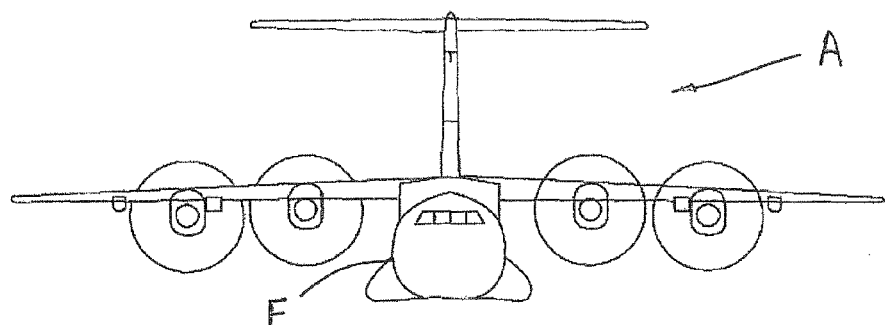
FIG. 3 is a schematic illustration of an aircraft in which cladding panels according to an embodiment of the invention are installed.

The panel 1 of the embodiment described above is designed for use in the cargo hold of a vehicle, particularly a transport aircraft. In this regard, FIG. 3 shows an aircraft A having a fuselage F housing a cargo hold that is lined with panels 1 formed according to the method of the present invention.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A method of producing a panel for lining or cladding an aircraft interior, such as an aircraft cargo hold, the method comprising:

arranging at least one resin layer of a thermo-plastic polymer and at least one reinforcement layer of reinforcement fibres upon one another in a stack, wherein each resin layer extends adjacent to and/or substantially parallel to each reinforcement layer; and consolidating the stack to form a panel by applying heat and pressure to the stack, wherein the pressure is applied to the stack in a direction substantially perpendicular to a primary plane of the layers, and wherein the pressure is applied to the stack in a non-constant distribution or a non-uniform distribution over the primary plane according to a distribution pattern;

wherein the distribution pattern includes regions of higher pressure and regions of lower pressure, the regions of higher pressure and the regions of lower pressure being provided in a regular pattern according to a distribution mask, wherein the distribution mask comprises a profiled pressure plate for pressing onto the stack, wherein the pressure plate has raised or projecting portions forming the regions of higher pressure and recesses or grooves between the raised portions defining the regions of lower pressure, and wherein the regions of lower pressure cover substantially more area in the primary plane than the regions of higher pressure.

2. The method according to claim 1, wherein the arranging comprises:
arranging a plurality of the resin layers and a plurality of the reinforcement layers upon one another in the stack, wherein the resin layers are interspersed with the reinforcement layers in the stack.

3. A method of producing a panel for lining or cladding an aircraft interior, such as an aircraft cargo hold, the method comprising:
arranging at least one resin layer of a thermo-plastic polymer and at least one reinforcement layer of reinforcement fibres upon one another in a stack, wherein each resin layer extends adjacent to and/or substantially parallel to each reinforcement layer, wherein the arranging comprises: arranging a first resin layer on a support or base to commence the stack, wherein the first resin layer has a white colour in normal light and has a high IR transmission rate; and
consolidating the stack to form a panel by applying heat and pressure to the stack, wherein the pressure is applied to the stack in a direction substantially perpendicular to a primary plane of the layers, and wherein the pressure is applied to the stack in a non-constant distribution or a non-uniform distribution over the primary plane.

4. The method according to claim 1, wherein each resin layer in the stack comprises a sheet or film of thermoplastic polymer.

5. The method according to claim 4, wherein the thermoplastic polymer is selected from the group of polyetherimide, polyetherether-ketone, and polytetrafluorethylene.

6. A method of producing a panel for lining or cladding an aircraft interior, such as an aircraft cargo hold, the method comprising:
arranging at least one resin layer of a thermo-plastic polymer and at least one reinforcement layer of reinforcement fibres upon one another in a stack, wherein each resin layer extends adjacent to and/or substantially parallel to each reinforcement layer, wherein the arranging comprises: arranging a damping layer in a central region of the stack between the resin layers and the reinforcement layers; and
consolidating the stack to form a panel by applying heat and pressure to the stack, wherein the pressure is applied to the stack in a direction substantially perpendicular to a primary plane of the layers, and wherein the pressure is applied to the stack in a non constant distribution or a non uniform distribution over the primary plane.

7. The method according to claim 6, wherein the damping layer comprises a resilient polyolefin sheet.

8. The method according to claim 1, wherein each reinforcement layer in the stack comprises a sheet or fabric of reinforcement fibres.

9. The method according to claim 8, wherein the sheet or fabric of reinforcement fibres comprises a woven or non-woven fabric of carbon fibres, glass fibres or aramid fibres.

10. A panel for lining or cladding an aircraft interior, the panel comprising a laminate of at least one thermoplastic resin layer and at least one fibre reinforcement layer,
wherein the thermoplastic resin layer is non-uniformly fused or bonded with the fibre reinforcement layer over a primary plane of the panel according to a predetermined pressure distribution pattern from a profiled pressure plate.

11. The panel according to claim 10, wherein the pattern of non-uniform fusion or non-uniform bonding of the resin layer with the reinforcement layer over the primary plane of the panel is a substantially regular pattern.

12. The panel according to claim 10, wherein the pattern of non-uniform fusion or bonding of the resin layer with the reinforcement layer includes a plurality of regions of relatively weak fusion or bonding separated or interrupted by lines or regions of relatively strong fusion or bonding.

13. The panel according to claim 10, wherein the regions of relatively weak fusion or bonding occupy a substantially larger area of the primary plane of the panel than the lines or regions of relatively strong fusion or bonding.

14. A vehicle which includes one or more panels, the panels comprising a laminate of at least one thermoplastic resin layer and at least one fibre reinforcement layer,
wherein the thermoplastic resin layer is non-uniformly fused or bonded with the fibre reinforcement layer over a primary plane of the panel according to a predetermined pressure distribution pattern from a profiled pressure plate, and
wherein the panel lines or clads an interior of the vehicle.

* * * * *